UNITED STATES PATENT OFFICE.

JOSEPH JAMES, OF BALTIMORE, MARYLAND.

COMPOSITION FOR CLEANING LITHOGRAPHIC STONES.

No. 813,709.     Specification of Letters Patent.     Patented Feb. 27, 1906.

Application filed December 4, 1905. Serial No. 290,092.

*To all whom it may concern:*

Be it known that I, JOSEPH JAMES, a citizen of the United States, residing at Baltimore city, State of Maryland, have invented certain new and useful Improvements in Compositions for Cleaning Lithographic Stones, of which the following is a specification.

My composition consists of the following ingredients combined in the proportions stated, viz: saturated solution of alum or acetic acid, thirteen ounces; saturated solution of strontian nitrate, seven and one-half ounces; nitric acid, about five ounces; water, substantially pure, fifteen ounces. These ingredients are thoroughly mingled by agitation.

By the use of the above composition in treating lithographic stones which have been previously used the former drawings or transfers are easily removed and a new sensitive surface obtained without the usual custom of grinding, planing, or cutting away the stone by treating the stone with my composition, which treatment consists of merely washing the surface of the stone with a suitable sponge or cloth saturated with the composition. All traces of former usage are removed, and a new and more sensitive surface is produced than by the methods now in use, and a great saving of time and labor is effected, and the stone is again prepared for use without the enormous waste of the stone as caused by the grinding or planing process.

Having described my invention, what I claim, and desire to secure by Letters Patent of the United States, is—

1. The herein-described composition of matter, consisting of an acid reacting compound, a solution of strontian nitrate, nitric acid and water substantially as described and for the purpose specified.

2. The herein-described composition of matter for preparing lithographic stones after having been previously used, consisting of a solution of acetic acid, thirteen ounces, a solution of strontian nitrate, seven and a half ounces, nitric acid, about five ounces, and water substantially pure, fifteen ounces, substantially as described.

3. The herein-described composition of matter for preparing lithographic stones after having been previously used, consisting of a solution of an acid reacting compound, thirteen ounces; a solution of strontian nitrate, seven and a half ounces, nitric acid, about five ounces, and water substantially pure fifteen ounces, substantially as described.

In testimony whereof I affix my signature in presence of two witnesses.

JOSEPH JAMES.

Witnesses:
E. WALTON BREWINGTON,
MARY M. MAGRAW.